S. MOLNAR.
HORSE DETACHER.
APPLICATION FILED FEB. 18, 1910.
959,373.
Patented May 24, 1910.
2 SHEETS—SHEET 2.
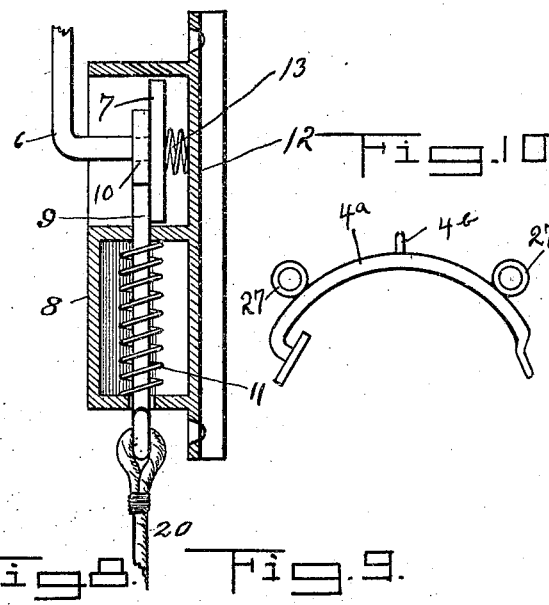
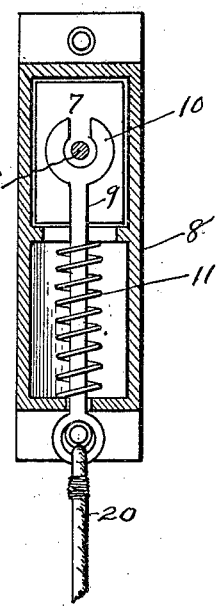
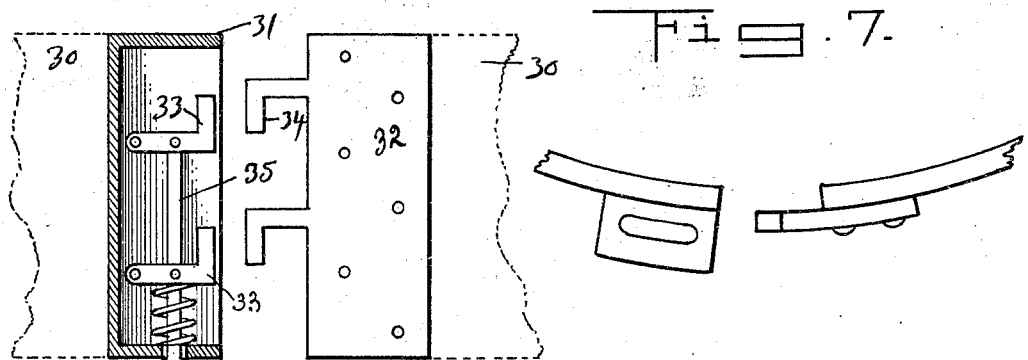
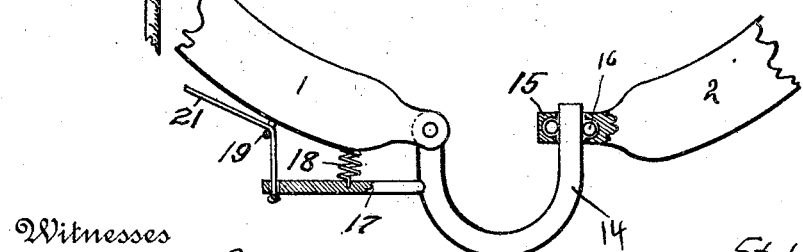
Witnesses
Inventor
Stefan MOLNAR
Attorneys

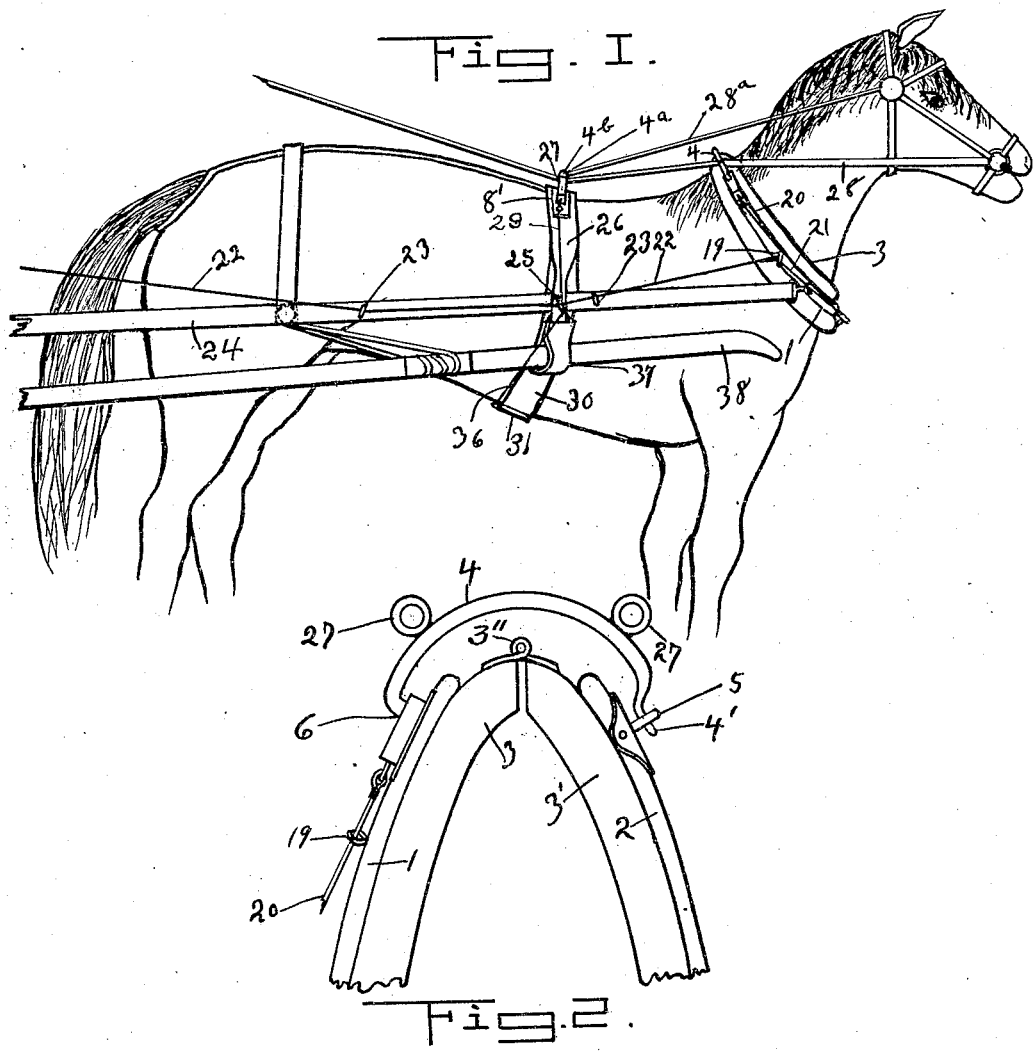

UNITED STATES PATENT OFFICE.

STEFAN MOLNAR, OF PITTSBURG, PENNSYLVANIA.

HORSE-DETACHER.

959,373.  Specification of Letters Patent.  Patented May 24, 1910.

Application filed February 18, 1910. Serial No. 544,662.

*To all whom it may concern:*

Be it known that I, STEFAN MOLNAR, a subject of the King of Hungary, residing at North Side, Pittsburg, in the county of Allegheny and State of Pennsylvania, have invented certain new and useful Improvements in Horse-Detachers, of which the following is a specification, reference being had therein to the accompanying drawing.

This invention relates to improvements in horse detachers and has for its object the provision of simple and effective means for releasing a run-away horse or a team of horses from a vehicle to which they are attached by the usual form of harness.

The further object of this invention is to provide a horse detacher that may be applied to a set of harness without disfiguring the harness or impairing its usefulness. To this end, I have devised novel means for releasing the hames of a collar, the bellyband or saddle and the terret supporting yoke, thus releasing that part of the harness attached to the vehicle.

The details of construction entering into the invention will be presently described reference being had to the drawings, in which like designating numerals refer to corresponding parts throughout the several views, and in which—

Figure 1 is an elevation of harnessed horse hitched to the vehicle shafts and illustrating my invention as applied to the harness, Fig. 2 is an enlarged view of a top portion of the collar with the hames secured thereon, Fig. 3 is an enlarged view of the lower portion of the same, Fig. 4 is an enlarged detail view of the lower portion of the hames detached from the collar and showing the hook connection therebetween, Fig. 5 is a vertical sectional view of a device used in connection with the hames and saddle and the terret supporting yokes, Fig. 6 is a transverse sectional view of the same, Fig. 7 is a side elevation of the confronting ends of a girth or belly-band equipped with my fastener, Fig. 8 is a horizontal sectional view of said fastener, and Fig. 9 is a plan of a portion of the same, and Fig. 10 is a view of the saddle supported terret yoke detached.

Referring in detail to the drawings, 1 and 2 designate the separate hames of the two-part horse collar, consisting of the side members 3, 3', hinged together at the top by the hinge member 3''. The upper ends of said hames are connected by the yoke 4 having loose connection at one straightened end thereof 4' projected through the eyelet 5 carried by the hame 2, while the opposite end thereof is hook-shaped as at 6 and provided with the plate 7. The pin 9 is normally held in engagement with said plate by a coil spring 11 and surrounds said pin, said spring being located within the housing 8. Interposed between the plate 7 and the back plate 12 of said housing is the coil spring 13 which forces said plate 7 from the housing when the latter is released from its engagement with the bifurcated end 10 of the pin 9. Said back plate 12 of the housing is adapted for attachment to the hame 1. The lower end of said hame 1 is provided with a pivoted hook 14 for engaging within the apertured end 15 of the hame 2, said apertured end of the hame being provided with roller bearings 16 for the hook 14. Said hook member 14 is provided adjacent to the pivoted end thereof with an extension 17 and interposed between such extension and the hame 1 is the coil spring 18, said spring normally holding the hook 14 within the aperture of the end 15 of the hame 2.

The hame 1 is provided with eyelets 19 and fastened through said eyelets are cables 20, 21 which are respectively attached to the pin 9 and the extension 17. The cables 20, 21 are also attached to the cable 22 which passes through the eyelet 23 carried by the tug or trace 24 and then through the eyelet 25 carried by the girth or saddle 26. The cable 22 then extends upwardly to the driver's seat of the vehicle in order that the same may be pulled to release the hames of the collar, it being evident that the positioning of the eyelets 23, 25 upon the harness may be in any desired manner with the employment of a fewer or larger number of eyelets if desired.

Upon the saddle 26 is arranged the yoke 4$^a$ similar to the hame yoke 4, but preferably with the addition thereto of the centrally positioned hook 4$^b$ for the reception of the check rein. The ends of said yoke 4$^a$ are mounted upon the plate 8' of the saddle in the same manner as the opposite ends of the yoke 4 are attached to the two hames and it is therefore thought unnecessary to describe this specific manner in which this yoke 4ᵃ is secured through such means to the saddle 26, as in all respects such manner of setting up the yoke 4ᵃ with respect to the saddle 26 is similar to that of the yoke 4 with respect to the hames.

The terrets 27 for the reins 28 are mounted upon the yokes 4 and 4ᵃ, said terrets being disposed at each side of the yokes and releasable therewith from the saddle 26 by the cable 29 and from the hames by the cable 20. Said cable 29 is attached to the cable 22 for operatively actuating the same in releasing the yoke 4ᵃ from the saddle and a check rein 28ᵃ is shown in position engaged under the hook 4ᵇ of the yoke 4ᵃ.

In connection with the girth 30 a novel fastener is employed comprising the housing 31 carried by one end of the girth while the plate 32 is carried by the opposite end thereof. In the housing 31 are pivotally mounted L-shaped members 33 for engaging the hook-shaped members 34 of the plate 32. The members 33 are actuated by a spring pressed pin 35 extending into said housing and connecting with the members 33, said pin having attached thereto the cable 36 communicating with the cable 22.

Although I have here shown the loop members 37 for receiving the vehicle shafts 38 and the further construction of the harness in connection with a single horse and its attachment to a vehicle and have shown what may be termed a single draft harness with the employment of a draft collar, it is nevertheless to be understood that my invention also contemplates the use of the device in connection with a double harness or any other arrangement thereof in which a horse detacher is desirable and it is evident that only minor variations are required in accommodating the device to other forms of harness, it being seen that in connection with a double harness substantially the entire present arrangement of cables and eyelets and remaining details may be employed, which would in that case assume the same relative arrangement of parts with respect to the vehicle tongue as in the present disclosure of the thills.

The operation of this device is believed to be apparent from the above description. A sufficient pull given to the cable 22 effects a release of the fastening devices for the girth 30 and the yoke 4ᵃ of the saddle and at the same time further releases the yoke 4 from the hames and unhooks the lower ends of the hames, all of which results in the stripping of the harness from the horse, with the exception of the bridle, while the lines and check rein thereto attached are separated from the removed harness by the release of the two yokes bearing the rein terrets and hook. To prevent any entanglement between the different parts of the harness, it is advisable after the releasing movement has been imparted to the cable 22 and the yokes released thereby, to impart an upward motion to the lines by throwing the same which will easily clear said yokes, through which the lines pass, from the removed harness.

What I claim is:

1. In a horse detacher, hames provided with separable fasteners, a girth provided with a fastener, a saddle provided with a removable yoke having rein terrets mounted thereon, said yoke having a separable fastener, and a cable connected with all of said fasteners for releasing the girth, the yoke and hame simultaneously.

2. A horse detacher comprising hames provided with separable fasteners at the upper and lower ends thereof, a girth provided with a separable fastener, a yoke detachably-secured by separable fasteners to the hames and a single operating cable connected with all of said fasteners for operating the same in unison.

In testimony whereof I affix my signature in the presence of two witnesses.

STEFAN MOLNAR.

Witnesses:
  K. H. BUTLER,
  EVA A. MILNE.